United States Patent [19]

Rabenecker et al.

[11] Patent Number: 4,856,818

[45] Date of Patent: Aug. 15, 1989

[54] FOLDED RECORD MEDIUM AND A BLANK FOR A RECORD MEDIUM

[75] Inventors: Horst Rabenecker, Stockelsdorf; Jurgen Kruger, Lorrach/Buhl, both of Fed. Rep. of Germany

[73] Assignee: Draegerwerk, AG, Fed. Rep. of Germany

[21] Appl. No.: 173,713

[22] Filed: Mar. 25, 1988

[30] Foreign Application Priority Data

Mar. 27, 1987 [DE] Fed. Rep. of Germany ....... 3710228

[51] Int. Cl.⁴ ....................... G09B 29/00; G09B 19/00; B42F 21/00; B65D 27/08

[52] U.S. Cl. ........................................ 283/34; 283/36; 428/9; 229/72

[58] Field of Search ......................... 283/34, 36, 41, 2; 281/2, 3; 428/9, 17, 542.6; 434/150, 153; 493/405, 399; 229/72

[56] References Cited

U.S. PATENT DOCUMENTS

| | | | |
|---|---|---|---|
| 1,192,829 | 7/1916 | Harriman | 283/34 |
| 1,292,967 | 1/1919 | Sherlock | 229/72 |
| 1,659,067 | 2/1928 | Adams | 283/36 |
| 2,644,260 | 7/1953 | Woolven | 428/9 |
| 2,889,638 | 6/1959 | Anderson | 283/34 |
| 3,282,268 | 11/1966 | Jacobs | 283/36 |
| 3,348,325 | 10/1967 | Snelgrove | 283/36 |

FOREIGN PATENT DOCUMENTS

| | | | |
|---|---|---|---|
| 613092 | 11/1926 | France | 283/34 |
| 851073 | 1/1940 | France | 283/34 |
| 1379655 | 1/1975 | United Kingdom | 283/34 |

*Primary Examiner*—Frank T. Yost
*Assistant Examiner*—Paul M. Heyrana
*Attorney, Agent, or Firm*—McGlew & Tuttle

[57] ABSTRACT

A folded record medium for two to four different, segmentally arranged information portions is configured so that the interrelated segments of the information portions are easily accessible in a meaningful arrangement. According to the invention, this is achieved by the fact that the record medium comprises square sheets, which are joined together along a first fold line, and the connected pairs of sheets are joined together, stairway fashion in the unfolded state, along a second fold line, perpendicular to the first fold line and having the length of one side of a sheet.

7 Claims, 1 Drawing Sheet

FOLDED RECORD MEDIUM AND A BLANK FOR A RECORD MEDIUM

BACKGROUND OF THE INVENTION

1. Field of the Invention

The invention relates in general to record keeping, and in particular to a new and useful folded record medium for two to four different, segmentally arranged information portions and to a blank therefore.

With multilingual operating instructions and the like it is difficult to find the relevant portions of text in the desired language. Large volume operating instructions are published in book form, for example, and the respective complete text are arranged in sequence in the various languages. If the information portions are in two languages, a good retrieval can be achieved with the portions of information printed side by side. Such two-page partitioning, however, is not easily achieved when the information is present in rather large volume, due to the size of the information records.

For multilingual operating instructions or directions there is the so-called Leporello fold, in which the various information portions pertaining to the individual editions or the various languages can be looked up by pulling apart the folded pages.

2. SUMMARY OF THE INVENTION

The invention provides a folded record medium for two to four different, segmentally arranged information portions which is easy to handle and makes it easy to look up the appropriate information portions. The characteristic feature of the invention should be seen in the fact that the record medium comprises of square sheets which are joined together along a first fold line, and the joined pairs of sheets are connected together along an additional, second fold line, perpendicular to the first fold line and having the length of one side of the sheet, resembling a stairway in the unfolded condition. When such record media are folded together along their fold lines, the result in a square folded block which can be opened like a book. Which of the information portions are opened up, depends entirely on the position of the edge of the folded record medium. Each information portion complete in itself can be spread out in a Leporello fold.

When the edge is in one position, certain of the interrelated information portions are accessible. When turned through 90 degrees, other interrelated information portions can be opened up like a book in succession. In this way, four different segmentally arranged information portions can each be opened like a book, and the volume of successive information portions, individually or as a whole, may be rather considerable.

The front page may contain directions as to the position of the individual information portions, such as the languages used in operating instructions. The user then looks up the information portion which applies to him and can page through it like a book.

A further advantage can be achieved by having aids to turn the pages arranged on the free sides of the sheets. These can be tabs which form a single piece with the sheets or recesses cut out of the sheets.

Such record media can be used with advantage for the most diverse segmented information portions, such as multilingual operating instructions, operating instructions of different types, medicine packaging directions, illustrations for certain interrelated subjects, and so on.

Accordingly, an object of the invention is to provide a folded record medium for a plurality of different segmentally arranged information portions which comprises substantially square sheets joined together along a first fold line wherein the joined pairs of sheets are joined together along a second fold line which is perpendicular to the first fold line and comprises the length of one side of the sheet and resembles a stairway in an unfolded condition.

A further object of the invention is to provide a blank for a record medium which comprises first and second interconnective substantially square panels having a first fold line there between, at least one first substantially square panel connected to said second panel having a second fold line there between which is at right angles to the first fold line and including at least one first lateral panel having at least one substantially square first adjacent panel connected thereto separated by a fold line which is parallel to the first fold line on the adjacent panel having at least one second substantially square lateral panel connected thereto separated by a fold line which is parallel to the first fold line.

A further object of the invention is to provide a folded record media and a blank folded record media which simple in design, rugged in construction, and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

GENERAL DESCRIPTION OF THE PREFERRED EMBODIMENTS

Figure 1:
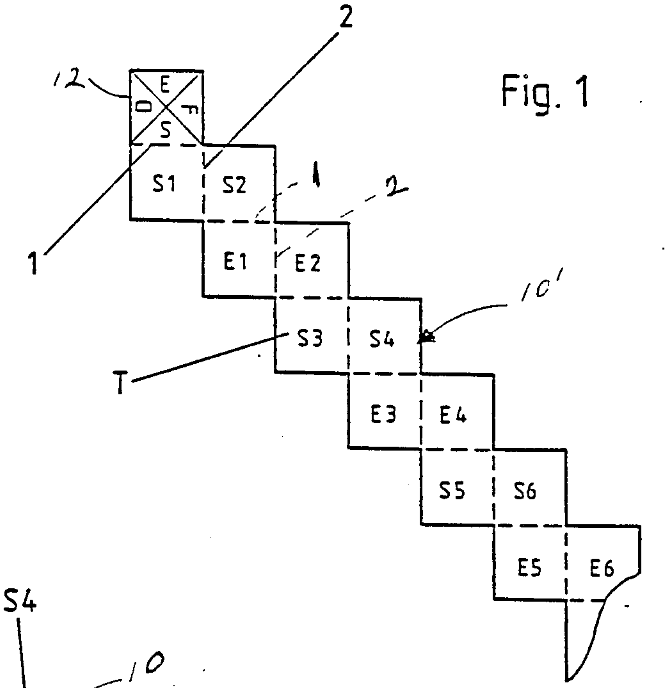
FIG. 1, is a record medium in the unfolded state constructed in accordance with the invention.
Figure 2:
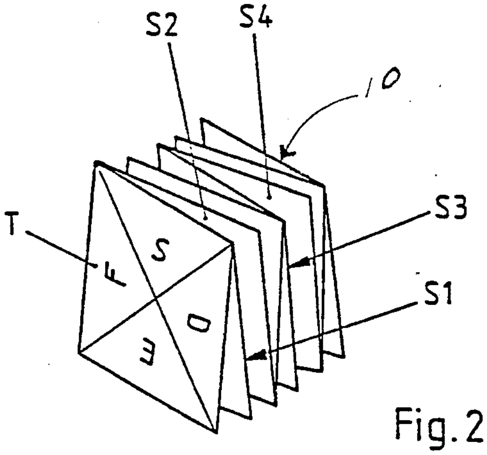
FIG. 2, is a perspective view of the record medium in the folded state.

According to the drawings in particular the invention embodied therein comprises a record medium which is indicated in its folded state and generally designated 10 in FIG. 2, and has a blank generally designated 10' as shown in FIG. 1. As shown in FIG. 1 the blank 10' includes a record medium comprising a first of substantially square panels 12, which is interconnected with a second substantially square panel designated S1, which has a horizontal first fold line 1 there between at least one first lateral panel S2, which is also substantially square connected to the second panel S1 and there is a substantially vertical second fold line 2 there between. The fold lines 1 and 2 are at right angles to each other and in the showing of FIG. 1 the fold line 1 is oriented horizontally and the fold line 2 is oriented vertically, but such orientation may be reversed and they should be at substantially right angles to each other.

The first lateral panel S2 has at least one substantially square first adjacent panel E1, which adjacent panel E1 has at least one second substantially square lateral panel E2 separated therefrom by a critical fold line 2, and so on.

FIGS. 1 and 2 show a record medium carrying four segmentally arranged information portions S, D, E, F with their segments S1, S2, S3, S4, S5, S6; D1, D2, D3, D4, D5, D6; E1, E2, E3, E4, E5, E6; and F1, F2, F3, F4, F5, F6. The information portions S1 through S6 and E1 through E6 lie on the depicted front side of the segment, while the information portions D1, D2, D3, D4, D5, D6 and F1, F2, F3, F4, F5, F6 are correspondingly arranged on the back side of the segment on the individual sheets T. The broken lines indicate the first fold line 1 and the second fold line 2 of the segment, which can be folded together into the compact form of FIG. 2 by progressively folding along fold lines 1 and 2. If, for example, the record media shown in FIG. 1 and 2 are operating instructions in the languages Spanish, German, English, and French, corresponding to S,D,E and F, the respective information portions can each be opened like a book as in FIG. 2.

Figure 3:
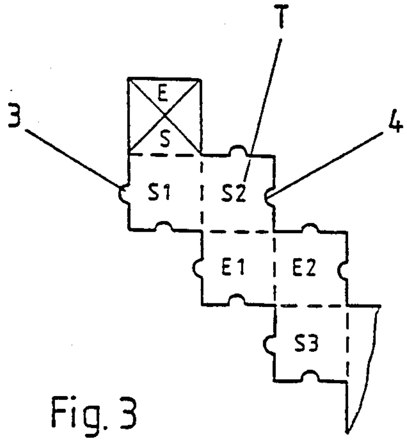
FIG. 3, is another embodiment of the record medium in the unfolded state with aids to turn the pages.

In the example of FIG. 3, aids to turning the pages in the form of tabs 3 and recesses 4 are provided on the sheets T of the information portions. These are a familiar means of facilitating the opening of the bookwise folded record media.

The record medium can be made of different materials, preferably paper, thin cardboard, or plastic foil.

While specific embodiments of the invention have been shown and described in detail to illustrate the application of the principals of the invention, it will be understood that the invention may be embodied otherwise without departing from such principles.

What is claimed is:

1. A folded record medium for a plurality of different segmentally arranged information portions, comprising interconnected first and second substantially square pieces of sheets joined together along a first fold line forming a first joined pair of sheets, said first joined pair of sheets being joined together along a second fold line which is perpendicular to said first fold line to interconnect third and fourth substantially square pieces of sheets, said third and fourth substantially square pieces being joined along a third fold line to form a second joined pair of sheets, said second joined pair of sheets being joined together along a fourth fold line, perpendicular to the third fold line to interconnected fifth and sixth substantially square pieces of sheets, said fifth and sixth substantially square pieces being joined along a fifth fold line to form a third joined pair of sheets, a plurality of coherent displays formed of said information portions, a first information portion of a first display being positioned on said first substantially square piece and a second information portion of said first display being positioned on said second substantially square piece, a first information portion of a second display being positioned on said third substantially square piece and a second information portion of said second display being positioned on said fourth substantially square piece, a fourth information portion of said first display being positioned on the fifth substantially square piece and the fourth information portion of the first display being positioned on the sixth substantially square piece, said second fold line being of a length of one side of said sheet pieces and said record medium having an outline in an unfolded position resembling a stairway.

2. A folded record medium according to claim 1 further comprising aids portion means associated with the sheets for facilitating the turning thereof into and out of a folded condition.

3. A folded record medium according to claim 1, wherein said aids portion means comprises tabs which are formed as an integral part of said sheets.

4. A folded record medium according to claim 1, wherein said aids portion means comprises a recess cut out of said sheets.

5. A blank for record medium comprising: first and second interconnected substantially square panels having a horizontal first fold line therebetween; a first lateral substantially square panel connected to said second panel by a substantially vertical second fold line; a substantially square first sub-adjacent panel connected to said first lateral panel by a second horizontal fold line; a second substantially square lateral panel connected to said first sub-adjacent panel by a second vertical fold line; a second sub-adjacent panel connected to said second lateral panel by a third horizontal fold line; a third substantially square lateral panel connected to said second sub-adjacent panel by a third vertical fold line, said blank repeating in a similar manner through a selected number of sub-adjacent and lateral panels; a plurality of coherent displays, each coherent display being formed of a plurality of information portions, a first information portion of a first coherent display being formed on said second panel, a second information portion of said first display being formed on said first lateral panel, a first information portion of a second display being formed on said first sub-adjacent panel, a second information portion of said second display being formed on said second substantially square lateral panel, a third information portion of said first display being formed on said sub-adjacent panel, a fourth information portion of said first display being formed on a third substantially square lateral panel, said blank being foldable to form a booklet which may be opened to view a single coherent display at once.

6. A blank according to claim 5, wherein said second panel has a projection on a side thereof and a recess on an edge thereof adjacent said side.

7. A blank according to claim 6, wherein said second panel and all of the other panel connected to said second panels has a side edge with a projection and another side edge adjacent to said edge with a recess.

* * * * *